United States Patent
Vidyadhara et al.

(10) Patent No.: US 11,803,454 B2
(45) Date of Patent: Oct. 31, 2023

(54) CHAINED LOADING WITH STATIC AND DYNAMIC ROOT OF TRUST MEASUREMENTS

(71) Applicant: Dell Products L.P., Round Rock, TX (US)

(72) Inventors: Sumanth Vidyadhara, Bangalore (IN); Nicholas D. Grobelny, Austin, TX (US); Lip Vui Kan, Singapore (SG); Ricardo L. Martinez, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 257 days.

(21) Appl. No.: 17/246,378

(22) Filed: Apr. 30, 2021

(65) Prior Publication Data

US 2022/0350717 A1 Nov. 3, 2022

(51) Int. Cl.
*G06F 11/26* (2006.01)
*G06F 11/22* (2006.01)
(Continued)

(52) U.S. Cl.
CPC ............. *G06F 11/26* (2013.01); *G06F 8/60* (2013.01); *G06F 9/4401* (2013.01); *G06F 9/445* (2013.01);
(Continued)

(58) Field of Classification Search
CPC .......... G06F 11/26; G06F 8/60; G06F 9/4401; G06F 9/445; G06F 11/2284; G06F 21/575; G06F 2221/033
See application file for complete search history.

(56) References Cited

U.S. PATENT DOCUMENTS

| | | | |
|---|---|---|---|
| 8,205,248 B2 * | 6/2012 | Challener | G06F 21/57 713/168 |
| 9,367,688 B2 * | 6/2016 | Smith | H04W 4/021 |

(Continued)

FOREIGN PATENT DOCUMENTS

| | | | | |
|---|---|---|---|---|
| WO | WO-2015065360 A1 * | 5/2015 | | G06F 12/0246 |
| WO | WO-2021056379 A1 * | 4/2021 | | G06F 21/53 |
| WO | WO-2022046074 A1 * | 3/2022 | | |

*Primary Examiner* — Matthew M Kim
*Assistant Examiner* — Indranil Chowdhury
(74) *Attorney, Agent, or Firm* — Jackson Walker L.L.P

(57) ABSTRACT

Establishing a diagnostic OS for an information handling system platform performing a UEFI BIOS boot to place the platform in a pre-OS state. Upon detecting a particular POST error and/or a platform configuration policy, an embedded OS kernel may be launched into a DRTM-authenticated measured launch environment (MLE). Additional objects for the diagnostic OS may be downloaded. The additional objects may include an initial ramdisk (initrd) module and one or more applications specific to the particular diagnostic OS. The diagnostic OS may be launched as follows: for each diagnostic OS application, launching the application and extending a measurement of the application into a DRTM PCR. Launching the diagnostic OS may include launching an initrd module and extending a measurement of the initrd module into the DRTM PCR. A measurement of embedded OS kernel may be extended into the TPM and the embedded OS kernel may validate the UEFI BIOS sequence.

16 Claims, 3 Drawing Sheets

(51) Int. Cl.
*G06F 9/4401* (2018.01)
*G06F 8/60* (2018.01)
*G06F 21/57* (2013.01)
*G06F 9/445* (2018.01)

(52) U.S. Cl.
CPC ........ *G06F 11/2284* (2013.01); *G06F 21/575* (2013.01); *G06F 2221/033* (2013.01)

(56) References Cited

U.S. PATENT DOCUMENTS

| | | | | |
|---|---|---|---|---|
| 10,635,821 | B2* | 4/2020 | Cheng | G06F 21/44 |
| 11,169,818 | B2* | 11/2021 | Suryanarayana | G06F 11/1417 |
| 11,604,882 | B2* | 3/2023 | Raghuram | G06F 21/575 |
| 11,657,158 | B2* | 5/2023 | Samuel | G06F 21/72 |
| | | | | 726/22 |
| 2006/0155988 | A1* | 7/2006 | Hunter | G06F 21/575 |
| | | | | 713/164 |
| 2008/0077993 | A1* | 3/2008 | Zimmer | G06F 21/575 |
| | | | | 726/27 |
| 2008/0235754 | A1* | 9/2008 | Wiseman | G06F 9/45558 |
| | | | | 718/1 |
| 2009/0125716 | A1* | 5/2009 | Wooten | G06F 21/57 |
| | | | | 713/164 |
| 2009/0172381 | A1* | 7/2009 | Zimmer | G06F 9/4401 |
| | | | | 713/2 |
| 2009/0249053 | A1* | 10/2009 | Zimmer | G06F 9/45558 |
| | | | | 713/2 |
| 2011/0060947 | A1* | 3/2011 | Song | G06F 21/53 |
| | | | | 718/1 |
| 2011/0154010 | A1* | 6/2011 | Springfield | G06F 21/57 |
| | | | | 713/150 |
| 2013/0232345 | A1* | 9/2013 | Johnson | G06F 21/71 |
| | | | | 713/193 |
| 2014/0025939 | A1* | 1/2014 | Smith | G06F 9/4401 |
| | | | | 713/2 |
| 2014/0258700 | A1* | 9/2014 | England | G06F 21/575 |
| | | | | 713/2 |
| 2016/0055113 | A1* | 2/2016 | Hodge | G06F 13/4027 |
| | | | | 710/308 |
| 2017/0177873 | A1* | 6/2017 | Raghuram | H04L 9/0894 |
| 2017/0300692 | A1* | 10/2017 | Robison | G06F 21/566 |
| 2018/0004953 | A1* | 1/2018 | Smith | H04L 9/3268 |
| 2020/0364342 | A1* | 11/2020 | Martinez | G06F 21/572 |
| 2022/0350615 | A1* | 11/2022 | Grobelny | G06F 9/4408 |
| 2023/0012979 | A1* | 1/2023 | Vidyadhara | G06F 9/45558 |
| 2023/0019303 | A1* | 1/2023 | Suryanarayana | G06F 8/60 |
| 2023/0112947 | A1* | 4/2023 | Suryanarayana | G06F 9/4405 |
| | | | | 713/2 |
| 2023/0153426 | A1* | 5/2023 | Grobelny | G06F 21/57 |
| | | | | 726/22 |

* cited by examiner

CHAINED LOADING WITH STATIC AND DYNAMIC ROOT OF TRUST MEASUREMENTS

TECHNICAL FIELD

The present disclosure relates to secure storage information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When an information handling system is reset, the system typically executes firmware that performs a boot process to initialize various system components and interfaces, load an operating system, and perform various other actions to configure the system into a known and initial state. Historically, basic input/output system (BIOS) was the de facto standard for boot process firmware. More recently, firmware compliant with the unified extensible firmware interface (UEFI) specification has evolved to address various limitations inherent in BIOS.

A UEFI-compliant boot process may define a boot manager that checks the boot configuration and, based on its settings, executes the specified operating system (OS) boot loader. However, if a system is unable to boot to the operating system after repeated attempts and a pre-boot system performance check detects no hardware issues, it may be desirable to provide an alternative method for recovering the operating system.

SUMMARY

In accordance with teachings disclosed herein, common problems associated with non-secure loading of diagnostic operating systems, are addressed methods and systems disclosed herein including method and systems employing chained loading of the diagnostic OS.

In accordance with disclosed subject matter, a method of establishing a diagnostic OS for an information handling system platform includes performing a UEFI BIOS boot, including one or more standard UEFI BIOS modules, to place the platform in a pre-OS state and, responsive to detecting either a particular platform configuration policy or a particular power on self test (POST) error, launching an embedded OS kernel into a dynamic root of trust measurement (DRTM)-authenticated measured launch environment (MLE). Based on the particular platform configuration policy, additional objects for the diagnostic OS may be downloaded. The additional objects may include an initial ramdisk (initrd) module and one or more applications specific to the particular diagnostic OS.

The method further includes launching the diagnostic OS, wherein said launching includes, for each diagnostic OS-specific application, launching the application and extending a measurement of the application into the at least one dynamic root of trust measurement (DRTM) platform control register (PCR) of the trusted platform module (TPM). The additional objects may further include an initial ramdisk (initrd) module, wherein launching the diagnostic OS includes launching the initrd module and extending a measurement of the initrd module into at least one DRTM PCR.

The UEFI BIOS boot may be a measured boot in which a measurement of each UEFI BIOS module is extended into the TPM and, in at least some embodiments, one or more static root of trust measurement (SRTM) platform control registers (PCRs) of the TPM. In measured boot embodiments, the first module to execute may be a core root of trust measurement (CRTM) module wherein the measurement of the CRTM module establishes a CRTM value against which the other modules can be validated. In at least one embodiment, a measurement of embedded OS kernel is extended into the TPM and the embedded OS kernel validates the measured boot sequence.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
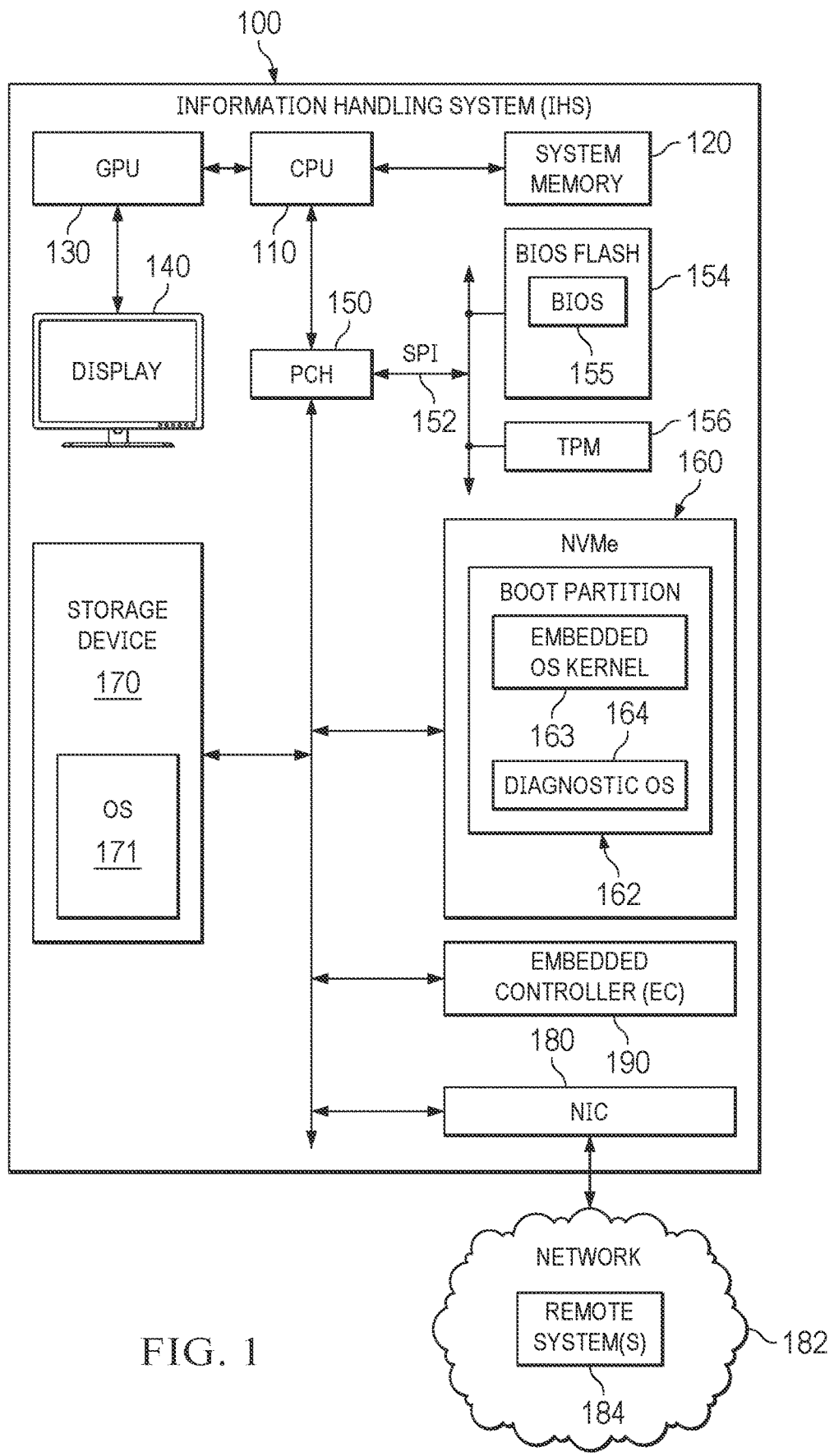
FIG. 1 is a block diagram of an information handling system in accordance with disclosed subject matter.
Figure 2:
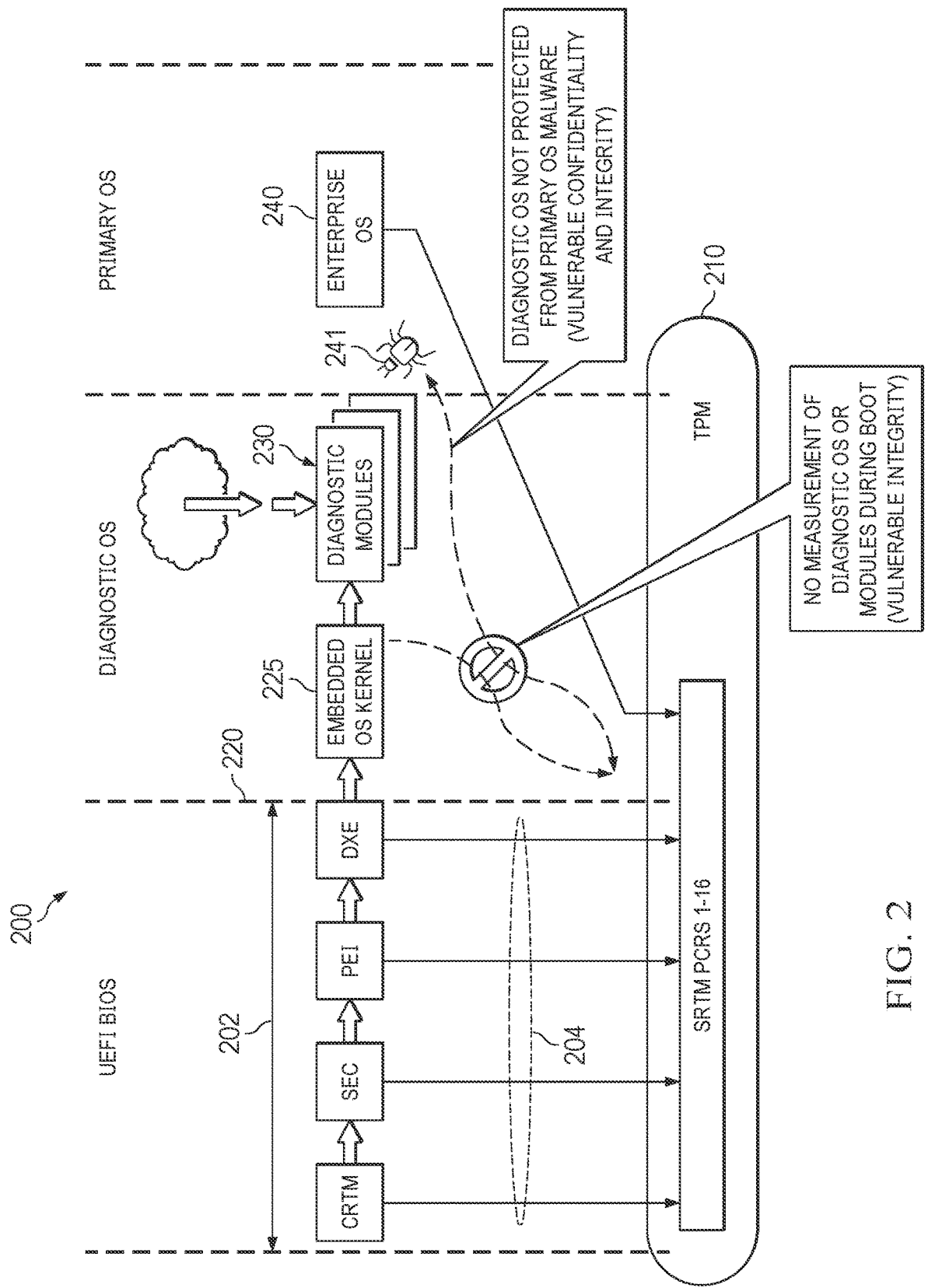
FIG. 2 illustrates a conventional insecure method of implementing a diagnostic OS on a faulty platform.
Figure 3:
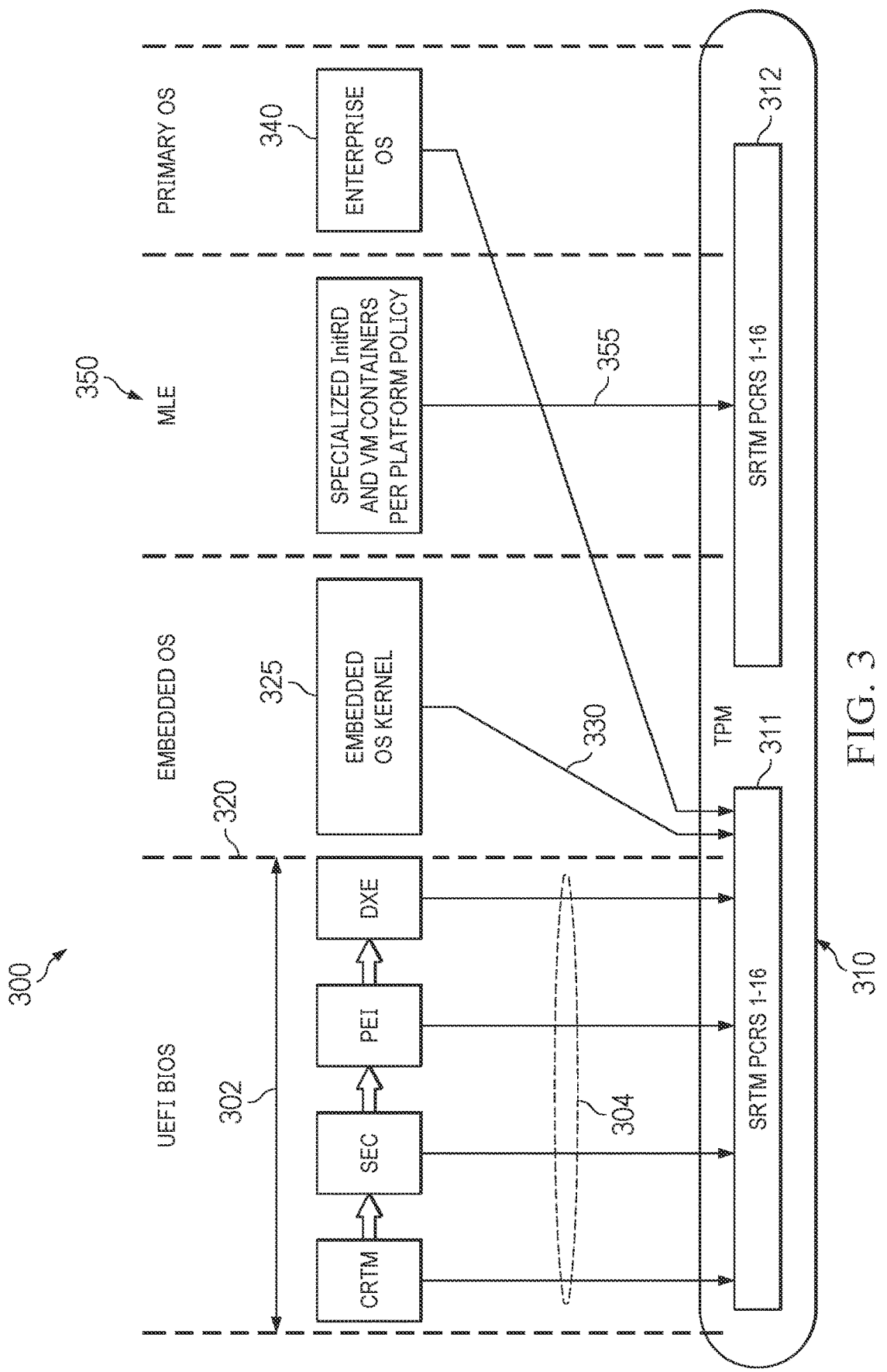
FIG. 3 illustrates a chained loading method for establishing a secure diagnostic OS environment.

Exemplary embodiments and their advantages are best understood by reference to FIGS. 1-3, wherein like numbers are used to indicate like and corresponding parts unless expressly indicated otherwise.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

Referring now to the drawings, FIG. 1 is a block diagram of an exemplary information handling system 100 (e.g., a desktop computer, laptop computer, tablet computer, server, Internet of Things (IoT) device, etc.) as it may be configured according to one embodiment of the present disclosure. As shown in FIG. 1, information handling system (IHS) 100 may generally include at least one central processing unit (CPU) 110 (e.g., a host processor), a system memory 120, a graphics processor unit (GPU) 130, a display device 140, a platform controller hub (PCH) 150, BIOS flash 154 containing BIOS firmware 155, a trusted platform module 156, a non-volatile memory express (NVMe) storage resource 160, a computer readable storage device 170, a network interface card (NIC) 180, and an embedded controller (EC) 190.

System memory 120 is coupled to CPU 110 and generally configured to store program instructions (or computer program code), which are executable by CPU 110. System memory 120 may be implemented using any suitable memory technology, including but not limited to, dynamic random access memory or any other suitable type of memory. Graphics processor unit (GPU) 130 is coupled to CPU 110 and configured to coordinate communication between the host processor and one or more display components of the IHS. In the embodiment shown in FIG. 1, GPU 130 is coupled to display device 140 and configured to provide visual images (e.g., a graphical user interface, messages and/or user prompts) to the user.

Platform controller hub (PCH) 150 is coupled to CPU 110 and configured to handle I/O operations for the IHS. As such, PCH 150 may include a variety of communication interfaces and ports for communicating with various system components, input/output (I/O) devices, expansion bus(es), and so forth. The PCH 150 illustrated in FIG. 1 interfaces with a serial peripheral interface (SPI) bus 152, to which a BIOS flash 154, containing BIOS firmware 155, and a trusted platform module 156 are coupled. TPM 156 is a secure cryptoprocessor for securing system resources via cryptographic keys. TPM 156 may include a cryptographic processor that includes a random number generator, an asymmetric key generator, a secure hash generator, and a digital signature module. TPM may further include storage resources for storing various keys and platform configuration registers (PCRs).

PCH 150 is further coupled to an NVMe storage resource 160. NVMe storage resource 160 may include a NAND flash solid state drive (SSD) configured with a PCIe interface for coupling to a PCIe bus. The NVMe 160 illustrated in FIG. 1 has been configured with a boot partition 162. The boot partition 162 illustrated in FIG. 1 includes an embedded OS kernel 163 and one or more diagnostic OS 164 described in more detail below.

Storage device 170 may be any type of persistent, non-transitory computer readable storage device, including non-PCIe storage devices, such as one or more hard disk drives (HDDs) or solid-state drives (SSDs), and may be generally configured to store software and/or data. For example, computer readable storage device 170 may be configured to store an operating system (OS) 171 for the IHS, in addition to other software and/or firmware modules and user data. As known in the art, OS 171 may contain program instructions (or computer program code), which may be executed by CPU 110 to perform various tasks and functions for the information handling system and/or for the user.

NIC 180 enables IHS 100 to communicate with one or more remotely located systems and/or services 184 via an external network 182 using one or more communication protocols. Network 182 may be a local area network (LAN), wide area network (WAN), personal area network (PAN), or the like, and the connection to and/or between IHS 100 and network 182 may be wired, wireless or a combination thereof. For purposes of this discussion, network 182 is indicated as a single collective component for simplicity. However, it is appreciated that network 182 may comprise one or more direct connections to other remote systems and/or services, as well as a more complex set of interconnections as can exist within a wide area network, such as the Internet. NIC 180 may communicate data and signals to/from IHS 100 using any known communication protocol.

Embedded controller (EC) 190 is generally configured to boot the information handling system and perform other functions. EC 190 may generally include read only memory (ROM), random access memory (RAM) and a processing device (e.g., a controller, microcontroller, microprocessor, ASIC, etc.) for executing program instructions stored within its internal ROM and RAM. For example, EC 190 may be configured to execute program instructions (e.g., a boot block) stored within its internal ROM to initiate a boot process for the information handling system.

Turning now to FIG. 2 a conventional method 200 of launching a diagnostic OS is illustrated. The method 200 illustrated in FIG. 2 includes a conventional measured UEFI BIOS boot sequence referred to herein simply as UEFI BIOS 202, during which standard UEFI modules (e.g., single edge contact (SEC), pre-EFI initialization (PEI), and driver execution environment (DXE) modules), are loaded and measurements 204 for some or all of the modules are extended into trusted platform module 210 as the platform is transitioned to a pre-OS state or condition 220. Launch method 200 then loads an embedded OS kernel 225, which may then load and launch one or more diagnostic modules 230.

It will be appreciated by those of ordinary skill in the field of information handling system security that neither the embedded OS kernel 225, nor any of the diagnostic modules 230 were measured into TPM 210 or otherwise authenticated, thereby resulting in confidentiality and integrity concerns. As an example, FIG. 2 illustrates an installed enterprise operating system 240 may be infected with malware 241 gaining unauthorized access to one or more diagnostic OS modules 230.

Referring now to FIG. 3, a chained loading method 300 for loading a diagnostic OS in a secure manner that protects the diagnostic OS integrity and confidentiality is illustrated. Generally, chained loading sequence 300 downloads diagnostic OS modules, measures them, extends their measurements into a TPM, and then uses a DTRM-authenticated measured launch environment (MLE) 350 to launch correctly-measured modules for the diagnostic OS so that those are protected from other OS code and also authenticated.

As illustrated in FIG. 3, chained loading sequence 300 begins, like the loading sequence 200 illustrated in FIG. 2, with a conventional UEFI front end sequence 302 in which standard UEFI modules (CRTM, SEC, PEI, DXE) are launched and one or more measurements 304 of the modules are extended into TPM 310, and, more specifically static platform configuration registers (PCRs) 311, 312 of TPM 310. In this manner, the chained boot sequence 300 illustrated in FIG. 3 arrives at a pre-OS state 320 analogous to the pre-OS state 220 in FIG. 2.

As illustrated in FIG. 3, however, a measurement 330 of the embedded OS kernel 325 is extended into the static PCR's of TPM 310 to validate the bare metal initrd. In this manner, the measured boot sequence is validated as part of the static CRTM.

Based on the Post errors or Platform configuration policy done, embedded OS kernel 325 is launched, from a protected NVMe disk, to load embedded OS kernel 325. Based on one or more platform configuration policies, a network stack (not depicted) of embedded OS kernel 325 downloads initrd diagnostic OS modules and one or more advanced OS Specific apps.

Each of these Modules are authenticated (355) and launched into the measured launch environment (MLE) 350.

The protection provided by the MLE 350 extends beyond pre-launch integrity verification. MLE 350 also prevents code from outside the MLE from viewing, erasing, changing the runtime memory or flow of execution of the diagnostics code inside the MLE. Without MLE 350, other malware running in other applications or software, e.g., enterprise OS 340, could interrupt the diagnostic OS module and make modifications to memory that could affect diagnostic results, steal diagnostic OS module secrets, or alter the diagnostic OS to alter the diagnostic OS module behavior in a way that potentially compromises the security of the diagnostic OS module or the network connection.

In this manner, the illustrated chained loading of Advanced OS Application modules are validated based on platform configuration policy using Static CRTM (SCRTM) and Chained applications are measured using DRTM. The chained loading method 300 also implements chained loading of dynamic applications (e.g., initrd) over a network and validated using the embedded OS authenticated with SCRTM.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Defined terms. For the purposes of this disclosure, unless expressly indicated otherwise an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, when two or more elements are referred to as "coupled" to one another, such term indicates that such two or more elements are in electronic communication, mechanical communication, including thermal and fluidic communication, as applicable, whether connected indirectly or directly, with or without intervening elements.

What is claimed is:

1. A method of establishing a diagnostic operating system (OS) module for an information handling system platform, comprising:
   performing a unified extensible firmware interface (UEFI) basic input/output system (BIOS) boot to place the platform in a pre-OS state;
   responsive to detecting either a particular platform configuration policy or a particular power on self test (POST) error, launching the diagnostic OS module into a measured launch environment (MLE);
   based at least in part on the particular platform configuration policy, downloading additional objects for the diagnostic OS module, wherein the additional objects include one or more diagnostic OS-specific applications; and
   launching the diagnostic OS module, wherein said launching includes:
      for each diagnostic OS-specific application, launching the application and extending a measurement of the application into at least one dynamic root of trust measurement (DRTM) platform control register (PCR) of a trusted platform module (TPM).

2. The method of claim 1, wherein the UEFI BIOS boot includes one or more UEFI BIOS modules and further wherein the UEFI BIOS boot comprises a measured boot wherein a measurement of each UEFI BIOS module is extended into the TPM.

3. The method of claim 2, wherein the measurements of the UEFI BIOS modules are extended into one or more static root of trust measurement (SRTM) platform control registers (PCRs) of the TPM.

4. The method of claim 3, wherein the UEFI BIOS modules include a core root of trust measurement (CRTM) module and wherein a measurement of the CRTM module establishes a CRTM.

5. The method of claim 2, further comprising, validating, by an embedded OS kernel, the measured boot.

6. The method of claim 2, wherein launching an embedded OS kernel includes extending a measurement of the embedded OS kernel into the trusted platform module (TPM).

7. The method of claim 1, wherein the additional objects include an initial ramdisk (initrd) module and wherein launching the diagnostic OS module includes:
   launching the initrd module and extending a measurement of the initrd module into the at least one dynamic PCR of the TPM.

8. The method of claim 1, wherein the MLE comprises a dynamic root of trust measurement (DRTM)-authenticated MLE.

9. An information handling system platform, comprising:
   a central processing unit; and
   a nontransitory computer readable medium including processor executable instructions that, when executed, cause the system to perform operations for establishing a diagnostic operating system (OS), the operations comprising:
   performing a unified extensible firmware interface (UEFI) basic input/output system (BIOS) boot to place the platform in a pre-OS state;
   responsive to detecting either a particular platform configuration policy or a particular power on self test (POST) error, launching a diagnostic OS module into a measured launch environment (MLE);
   based at least in part on the particular platform configuration policy, downloading additional objects for the diagnostic OS module, wherein the additional objects include one or more diagnostic OS-specific applications; and
   launching the diagnostic OS module, wherein said launching includes:
      for each diagnostic OS-specific application, launching the application and extending a measurement of the application into at least one dynamic root of trust measurement (DRTM) platform control register (PCR) of a trusted platform module (TPM).

10. The information handling system of claim 9, wherein the UEFI BIOS boot includes one or more UEFI BIOS modules and further wherein the UEFI BIOS boot comprises a measured boot wherein a measurement of each UEFI BIOS module is extended into the TPM.

11. The information handling system of claim 10, wherein the measurements of the UEFI BIOS modules are extended into one or more static root of trust measurement (SRTM) platform control registers (PCRs) of the TPM.

12. The information handling system of claim 11, wherein the UEFI BIOS modules include a core root of trust measurement (CRTM) module and wherein a measurement of the CRTM module establishes a CRTM.

13. The information handling system of claim 10, further comprising, validating, by an embedded OS kernel, the measured boot.

14. The information handling system of claim 10, wherein launching an embedded OS kernel includes extending a measurement of the embedded OS kernel into the trusted platform module (TPM).

15. The information handling system of claim 9, wherein the additional objects include an initial ramdisk (initrd) module and wherein launching the diagnostic OS module includes:
   launching the initrd module and extending a measurement of the initrd module into the at least one dynamic PCR of the TPM.

16. The information handling system of claim 9, wherein the MLE comprises a dynamic root of trust measurement (DRTM)-authenticated MLE.

* * * * *